Aug. 26, 1924.
G. E. DEAN
POULTRY COOP OR CRATE
1,506,570
Filed Jan. 15, 1924    2 Sheets-Sheet 1
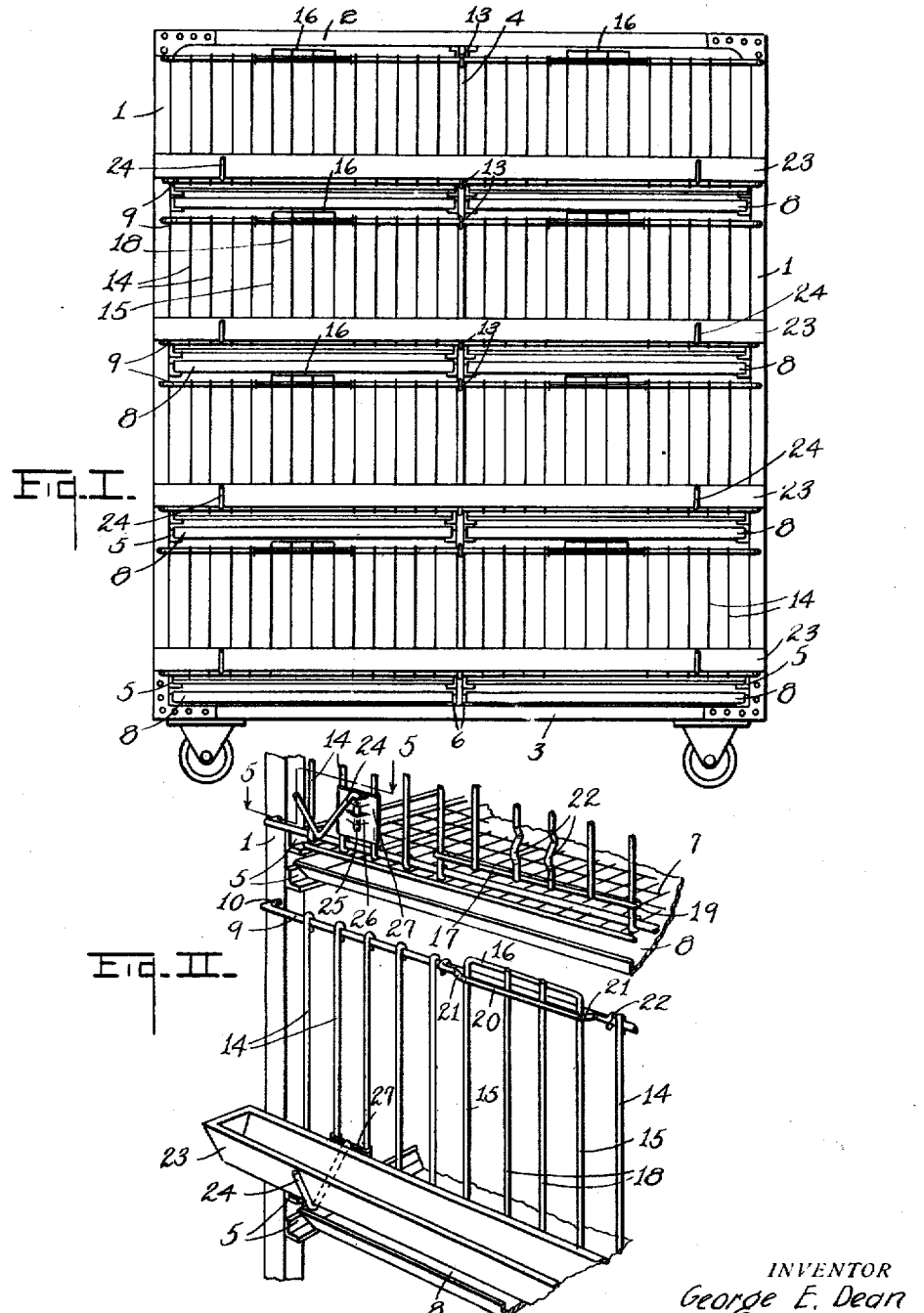
INVENTOR
George E. Dean
BY Chappell Earl
ATTORNEYS

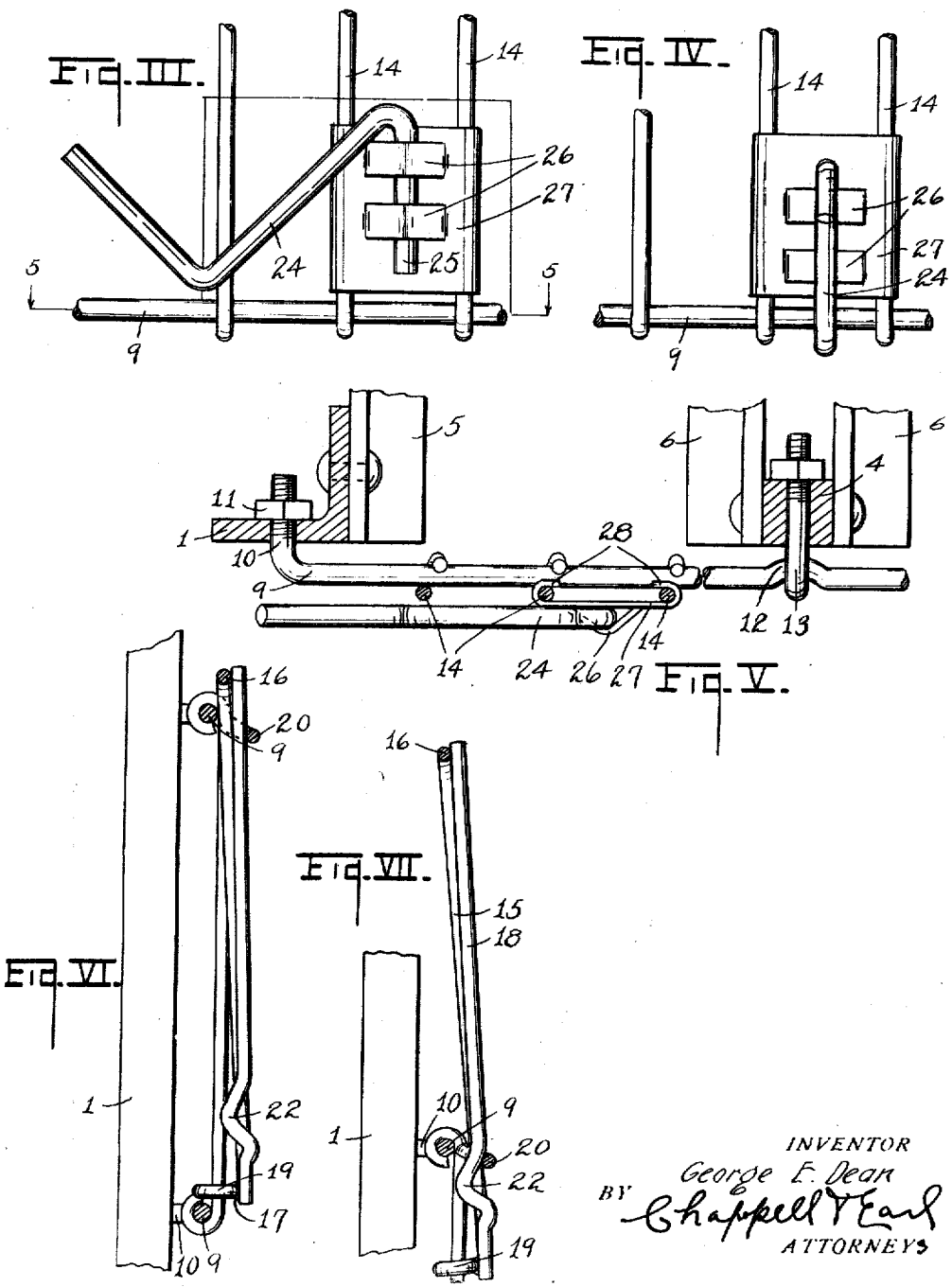

Patented Aug. 26, 1924.

1,506,570

UNITED STATES PATENT OFFICE.

GEORGE E. DEAN, OF ALBION, MICHIGAN, ASSIGNOR TO UNION STEEL PRODUCTS COMPANY, OF ALBION, MICHIGAN.

POULTRY COOP OR CRATE.

Application filed January 15, 1924. Serial No. 686,264.

*To all whom it may concern:*

Be it known that I, GEORGE E. DEAN, a citizen of the United States, residing at Albion, county of Calhoun, State of Michigan, have invented certain new and useful Improvements in Poultry Coops or Crates, of which the following is a specification.

This invention relates to improvements in poultry coops or crates.

I have illustrated my improvements as I have embodied the same in poultry coops or crates for exhibition and feeding purposes, although readily adapted for shipping crates and the like.

The main objects of this invention are:

First, to provide a poultry coop or crate of the class described which is rigid and durable in structure, and at the same time one in which the parts may be readily formed and assembled.

Second, to provide in a poultry coop or crate an improved door structure whereby the door is effectively supported in open position and may be easily closed or released.

Third, to provide in a poultry crate or coop an improved trough supporting means which may be quickly adjusted or applied to the crate, the supporting bracket being adapted to fold flat against the crate so that it does not form an obstruction when the crate is moved about.

Objects pertaining to details and economies of construction of my improvements will definitely appear from the detailed description to follow.

I accomplish the objects of my invention by the devices and means described in the following specification. The invention is clearly defined and pointed out in the claims.

A structure which is a preferred embodiment of my invention is clearly illustrated in the accompanying drawing forming a part of this application, in which:

Fig. I is a side elevation of a poultry crate or coop of the "battery" type embodying the features of my invention.

Fig. II is a fragmentary perspective view showing structural details.

Fig. III is an enlarged fragmentary front elevation showing one of the trough supporting brackets in its collapsed position.

Fig. IV is a fragmentary elevation showing the bracket in extended position to receive a trough.

Fig. V is an enlarged detail view, partially in section, on a line corresponding to line 5—5 of Figs. II and III.

Fig. VI is a detail vertical section through one of the doors with the door closed.

Fig. VII is a similar detail section with the door open.

In the drawing the sectional view is taken looking in the direction of the little arrows at the end of the section line and similar numerals of reference indicate similar parts throughout the several views.

Referring to the drawing, I provide a frame consisting of the corner uprights 1 connected by the top piece 2 and the bottom piece 3. These uprights are formed of angle iron and are arranged with their angles facing outwardly.

In the structure illustrated I also provide an intermediate upright 4. The floor ledges 5 are secured to the inwardly projecting legs of the angle irons while the corresponding ledges 6 are secured to the uprights 4 in opposed relation to receive the screen bottom 7 and the bottom pan 8.

I provide wall panels or units consisting of the horizontal rods or bars 9 having laterally turned ends 10 disposed through the outwardly projecting legs of the corner uprights and threaded to receive the nuts 11 whereby the wall panels are secured. These bars 9 have offsets 12 opposite the uprights 4 to receive the eye bolts 13 arranged through the uprights 4, see Fig. V.

The vertical wire slats 14 are secured in suitably spaced relation to these horizontal bars so that the panels constitute complete units and may be assembled on the frame as such. The slats 14 are arranged to provide door openings the doors being designated generally by the numeral 15 consisting of top pieces 16, bottom pieces 17 and the vertical slats 18. These parts are formed of wire.

The bottom pieces of the door terminate in eyes 19 which slidably engage the slats 14 at each side of the door opening. A door supporting slide 20 is secured to the top horizontal bar 9, this slat being formed of wire with offsets 21 at each side of the door and terminating in eyes 22 embracing the bars 9 so that the door slides between this slat 20 and the bar 9 as illustrated.

One or more of the vertical slats 18 of the door are offset or kinked at 22 adjacent the lower end thereof so that when the door is in elevated position the slat engages the slide 20 under spring tension thereby supporting the door in its elevated position, permitting it to be disengaged, however, by a slight tap or blow on the upper end of the door or pushing inwardly on the slat having the offset or kink therein, so that the operator may release the door without manipulation with the hands, as by striking the top of it or pushing with the elbow, thus permitting the door to be closed by the operator when removing the fowls from the coop.

The trough 23 is supported on the outside of the coop by means of the brackets 24, these, in the embodiment illustrated being formed of rods bent into a U-shape, the inner arms terminating in downturned pintles 25. These pintles are engaged with loops 26 struck out from the bracket attaching plates 27 formed of sheet metal, the vertical edges of these plates having inturned channel-shaped flanges 28 engaged with a pair of vertical slats 14, the slats being sprung to receive the plates so that the plates are supported under spring friction and gripping action.

This allows for the vertical adjustment of the trough as may be desired and permits the parts being readily assembled and disassembled. Further, when the trough is removed the brackets may be swung flat against the side of the coop, a matter of convenience in shipping the coop, or when it is moved through a door opening or the like the brackets do not form obstructions and they are not likely to be accidentally torn off or broken.

I have illustrated and described my improvements in an embodiment or adaptation which I have found very practical. I have not attempted to illustrate or describe other adaptations which I have made to other forms of poultry coops or crates as I believe the disclosure made will enable those skilled in the art to which my invention relates to embody or adapt the same as may be desired.

Having thus described my invention what I claim as new and desire to secure by Letters Patent is:

1. In a poultry coop or crate, the combination of angle iron corner uprights disposed with their angles facing outwardly, an intermediate upright, floor supporting ledges secured to the inwardly projecting legs of said corner uprights, wall panels comprising horizontal bars having laterally turned ends disposed through the outwardly projecting legs of said corner uprights and secured thereto, said bars having offsets opposite said intermediate upright, vertical slats secured to said horizontal bars, and eye bolts disposed through said intermediate upright and engaging said offsets in said horizontal bars.

2. In a poultry coop or crate, the combination of angle iron corner uprights disposed with their angles facing outwardly, floor supporting ledges secured to the inwardly projecting legs of said corner uprights, wall panels comprising horizontal bars having laterally turned threaded ends disposed through the outwardly projecting legs of said corner uprights and provided with nuts, and vertical slats secured to said horizontal bars.

3. In a poultry coop or crate, the combination of corner uprights disposed with their angles facing outwardly, an intermediate upright, floor supporting ledges secured to the inwardly projecting lugs of said corner uprights, wall panels comprising horizontal bars secured at their ends to the outwardly projecting legs of said corner uprights, said bars having offsets opposite said intermediate upright, vertical slats secured to said horizontal bars, and eye bolts disposed through said intermediate upright and engaging said offsets in said horizontal bars.

4. In a poultry coop or crate, the combination of corner uprights, an intermediate upright, wall panels comprising horizontal bars having laterally turned threaded ends disposed through said corner uprights and provided with nuts, said bars having offsets opposite said intermediate upright, vertical slats secured to said horizontal bars, and eye bolts disposed through said intermediate upright and engaging said offsets in said horizontal bars.

5. In a poultry crate, the combination with a frame, of a wall panel therefor comprising horizontal bars and vertical slats secured thereto, said slats being disposed to provide a door opening, a door comprising top and bottom pieces and a plurality of vertical slats, said bottom piece having eyes slidingly engaging the adjacent wall panel slats, and a door slide formed of wire secured to the top horizontal bar to embrace and slidably support said door, one of said door slats having an offset therein adapted to engage said slide under spring tension for supporting the door in elevated position.

6. In a poultry crate, the combination with a frame, of a wall panel therefor comprising vertical slats disposed to provide a door opening, a door comprising vertical slats and a bottom piece having eyes slidingly engaging said wall panel slats, and a door slide disposed to embrace and slidably support said door, one of said door slats having an offset therein adapted to engage said slide under spring tension for supporting the door in elevated position.

7. In a poultry crate, the combination with a frame, of a wall panel therefor comprising vertical slats disposed to provide a door opening, and a sliding door comprising vertical slats and a bottom piece having eyes slidingly engaging said wall panel slats, one of said door slats having an offset therein adapted to engage a relatively fixed part under spring tension for supporting the door in elevated position.

8. In a poultry coop or crate, the combination with a frame, of walls therefor comprising vertical wire slats, trough brackets, and attaching plates for said brackets, the vertical edges of said plates being formed into opposed flanges detachably and slidably engaging a pair of said slats, said slats being sprung to receive said attaching plates whereby they are engaged under spring tension.

9. In a poultry coop or crate, the combination with a frame, of walls therefor comprising vertical wire slats, trough brackets, and attaching plates for said brackets, the vertical edges of said plates being formed into opposed flanges engaged with a pair of said slats.

10. In a poultry coop or crate, the combination with a frame, of walls therefor comprising vertical wire slats, V-shaped trough brackets terminating in downturned pintles, and attaching plates for said brackets formed of sheet metal and having spaced pintle loops struck out therefrom to receive said pintles, said plates being detachably and slidably engaged with a pair of said slats.

11. In a poultry coop or crate, the combination with a frame, of walls therefor comprising vertical wire slats, trough brackets, and attaching plates for said brackets detachably and slidably engaged with a pair of said slats.

In witness whereof, I have hereunto set my hand.

GEORGE E. DEAN. [L. S.]